United States Patent
Moritz et al.

(10) Patent No.: US 11,789,120 B2
(45) Date of Patent: Oct. 17, 2023

(54) NETWORK NODE AND METHOD PERFORMED THEREIN FOR HANDLING DATA OF OBJECTS IN A COMMUNICATION NETWORK

(71) Applicant: Telefonaktiebolaget LM Ericsson (publ), Stockholm (SE)

(72) Inventors: Simon Moritz, Sollentuna (SE); Anna Nabseth, Bromma (SE); Olle Isaksson, Saltsjö-boo (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 244 days.

(21) Appl. No.: 17/421,436

(22) PCT Filed: Jan. 24, 2019

(86) PCT No.: PCT/SE2019/050050
§ 371 (c)(1),
(2) Date: Jul. 8, 2021

(87) PCT Pub. No.: WO2020/153883
PCT Pub. Date: Jul. 30, 2020

(65) Prior Publication Data
US 2022/0120857 A1 Apr. 21, 2022

(51) Int. Cl.
*H04B 7/06* (2006.01)
*H04W 4/029* (2018.01)
(Continued)

(52) U.S. Cl.
CPC ............ *G01S 7/412* (2013.01); *H04B 7/0617* (2013.01); *H04B 17/318* (2015.01); *H04W 4/029* (2018.02); *H04W 64/006* (2013.01)

(58) Field of Classification Search
CPC ... H04B 17/318; H04B 7/0617; H04W 4/029; H04W 64/006
(Continued)

(56) References Cited

U.S. PATENT DOCUMENTS

2005/0032531 A1 2/2005 Gong et al.
2012/0014412 A1 1/2012 Nakagawa et al.
(Continued)

FOREIGN PATENT DOCUMENTS

CN 109001673 A 12/2018
EP 3005581 B1 3/2019
(Continued)

OTHER PUBLICATIONS

EPO Communication with Supplementary European Search Report dated Aug. 5, 2022 for European Patent Application No. 19910963.8, consisting of 40-pages.
(Continued)

*Primary Examiner* — Ted M Wang
(74) *Attorney, Agent, or Firm* — Christopher & Weisberg, P.A.

(57) ABSTRACT

Embodiments herein relate to a method performed by a network node in a communication network for handling data of objects in the communication network. The network node determines a position of an object based on a signal strength or a signal quality of a beamforming transmission, wherein the beamforming transmission comprises transmitted radio beams that swipe a surrounding. The network node determines position by analysing the signal strength or signal quality of the transmitted radio beams and comparing signal strength or signal quality from a previous beamforming transmission that swipe the surrounding. The network node further provides an output indicating the determined position of the object.

18 Claims, 8 Drawing Sheets

(51) Int. Cl.
*G01S 7/41* (2006.01)
*H04B 17/318* (2015.01)
*H04W 64/00* (2009.01)

(58) Field of Classification Search
USPC ....................................................... 455/456.1
See application file for complete search history.

(56) References Cited

U.S. PATENT DOCUMENTS

| | | | |
|---|---|---|---|
| 2012/0127016 A1 | 5/2012 | Watanabe et al. | |
| 2013/0310067 A1 | 11/2013 | Nakata et al. | |
| 2016/0277899 A1 | 9/2016 | Persson et al. | |
| 2017/0302364 A1 | 10/2017 | Cesarano | |
| 2017/0374637 A1 | 12/2017 | Akkarakaran et al. | |
| 2018/0192426 A1* | 7/2018 | Ryoo | H04W 74/0833 |
| 2018/0341006 A1 | 11/2018 | Kirita | |
| 2019/0028343 A1* | 1/2019 | Putman | H04W 88/08 |

FOREIGN PATENT DOCUMENTS

| | | |
|---|---|---|
| WO | 2013017088 A1 | 2/2013 |
| WO | 2013170882 A1 | 11/2013 |
| WO | 2015096809 A1 | 7/2015 |
| WO | 2018168670 A1 | 9/2018 |

OTHER PUBLICATIONS

3GPP TSG RAN WG1 Ad-Hoc Meeting 1901 R1-1900512; Title: Analysis of Techniques for NR DL Positioning; Agenda Item: 7.2.10.1.1; Source: Intel Corporation; Document for: Discussion and Decision; Date and Location: Jan. 21-25, 2019, Taipei, Taiwan, consisting of 25-pages.

International Search Report and Written Report dated Oct. 18, 2019 for International Application No. PCT/SE2019/050050 filed Jan. 24, 2019, consisting of 11-pages.

EPO Communication dated May 24, 2023 for Patent Application No. 19910963.8, consisting of 5-pages.

3GPP TR 22.872 V16.1.0; 3rd Generation Partnership Project; Technical Specification Group Services and System Aspects; Study on positioning use cases; Stage 1 (Release 16); Sep. 2018, consisting of 75-pages.

\* cited by examiner

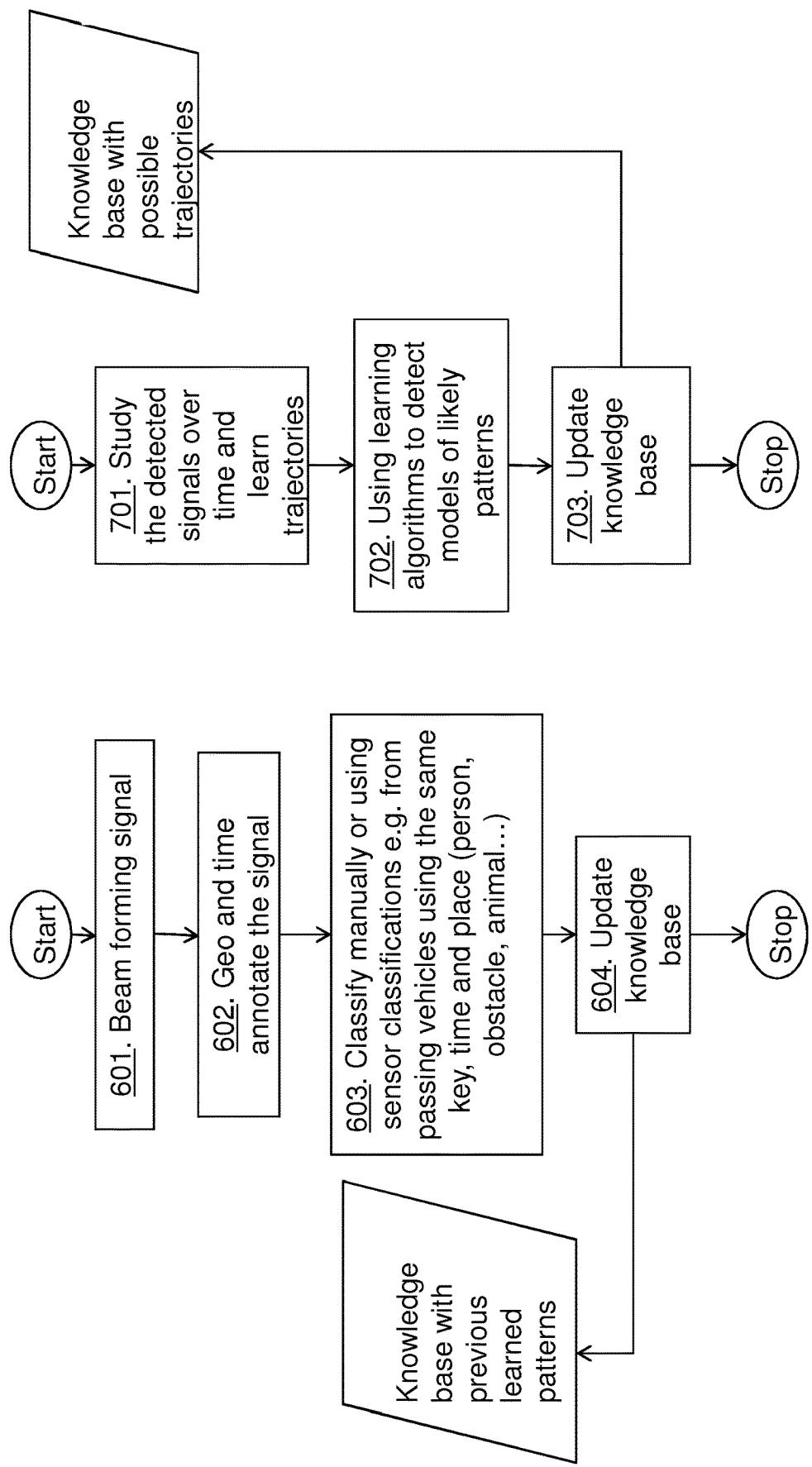

NETWORK NODE AND METHOD PERFORMED THEREIN FOR HANDLING DATA OF OBJECTS IN A COMMUNICATION NETWORK

CROSS-REFERENCE TO RELATED APPLICATIONS

This application is a Submission Under 35 U.S.C. § 371 for U.S. National Stage Patent Application of International Application Number: PCT/SE2019/050050, filed Jan. 24, 2019 entitled "NETWORK NODE AND METHOD PERFORMED THEREIN FOR HANDLING DATA OF OBJECTS IN A COMMUNICATION NETWORK," the entirety of which is incorporated herein by reference.

TECHNICAL FIELD

Embodiments herein relate to a network node and method performed therein for handling data of objects to be used in e.g. managing traffic of vehicles in an area such as a city. Furthermore, a computer program product and a computer readable storage medium are also provided herein. In particular, embodiments herein relate to handling data of an object for determining position of the object e.g. allowing traffic management taking the determined position into account.

BACKGROUND

In a typical wireless communication network, wireless devices, also known as wireless communication devices, mobile stations, stations (STA) and/or user equipments (UE), communicate via an access network such as a Radio Access Network (RAN) to e.g. one or more core networks for using a service such as a mobile broadband service. The access network covers a geographical area and provide radio coverage over service areas, which may also be referred to as a cell, a beam or a beam group, wherein each service area is served or controlled by a radio network node such as a radio access node e.g., a Wi-Fi access point or a radio base station (RBS), which in some networks may also be denoted, for example, a "NodeB" or "eNodeB" or "gNodeB". The radio network node communicates over an air interface operating on radio frequencies with the wireless device within range of the radio network node. There are a lot of service provided such as reporting of obstacles by vehicle and share through the cloud with other vehicles, see e.g. WO201317088A1 that shows a system for providing information to vehicles includes a receiver for receiving data from a plurality of vehicles including vehicle data and data from sensors associated with the vehicles.

Light Detection and Ranging (Lidar) is a laser radar that scans objects with radio waves being reflected back and creates a virtual digital world that is e.g. used for vehicles to position themselves on a digital world map mirroring a physical twin. A physical twin is an object in the real world that has a digital twin which is a replica in the digital world such as a virtual map. The conventional solutions provide e.g. an allocation of roads that is static and wherein the use of road infrastructure is inefficient. Presently zebra crossings are used by pedestrians and bikers to cross at predetermined locations. This also leads to a very static traffic infrastructure that hinders natural flow, especially flow that may fluctuate over time.

Another challenge around zebra crossings is that drivers of the vehicles or the driver assistance system are not always aware of the zebra crossings. Though the zebra crossings typically have a sign indicating a location of a zebra crossing the high amount of information directed to the drivers, especially close to roundabouts, makes it difficult to detect that there are a crossing of the street. Hence, the driver may miss that there are people crossing the street, and accidents may occur.

Today the number of lanes on a road is typically fixed and the utilization between different directions, such as outbound and inbound, is not even. This causes unnecessary traffic jams and hinders the flow of the traffic of vehicles. At events there are no good way to allocate roads for pedestrians, though most traffic management systems focus on the vehicles throughput despite the fact that the principle of people flow priorities the people throughput and not the vehicle throughput. There are today no good ways to follow up on this demand.

Furthermore, poor visibility of temporary objects such as pedestrians, animals, obstacles such as things that are dropped, in traffic environment increases risk for accidents and collisions between vehicles and objects.

25600 people lost their lives on European Union (EU) roads during 2017. This is only a 2% decline from 2016, showing that the member state struggles to reduce the number of casualties according to the latest Road Safety Performance Index (PIN) report from European Transport Safety Council (ETSC) (https://etsc.eu/two-passanger-planes-crash-killing-everyone-onboard-this-is-how-many-people-die-on-eu-road-every-week/). This equals the same amount of people as if two passenger planes would crash and kill everyone onboard every single week. Also according to ETSC most of these accidents are related to work, e.g. in Sweden 20 road workers per year are killed. That is why work related road safety (WRRS) is so crucial to decrease the accidents. But there are no connected WRRS products that are connected to a traffic management system. Directive 89/391/EEC outlines the importance of governments to provide guidance on work related risk assessment, but today there is no specific technique for them to enforce to solve the problem.

SUMMARY

An object of embodiments herein is to provide a mechanism for allowing traffic management of an area in an efficient and secure manner.

According to an aspect the object is achieved by providing a method performed by a network node in a communication network for handling data of objects in the communication network. The network node determines a position of an object based on a signal strength or a signal quality of a beamforming transmission, wherein the beamforming transmission comprises transmitted radio beams that swipe a surrounding. The network node determines position by analysing the signal strength or the signal quality of the transmitted radio beams and comparing the signal strength or the signal quality with signal strength or signal quality from a previous beamforming transmission that swipe the surrounding. The network node further provides an output indicating the determined position of the object.

It is furthermore provided herein a computer program product comprising instructions, which, when executed on at least one processor, cause the at least one processor to carry out any of the methods above, as performed by the network node. It is additionally provided herein a computer-readable storage medium, having stored thereon a computer program product comprising instructions which, when executed on at least one processor, cause the at least one processor to carry out the method according to any of the methods above, as performed by the network node.

According to still another aspect the object is achieved by providing a network node for handling data of objects in a communication network. The network node is configured to determine a position of an object based on a signal strength or a signal quality of a beamforming transmission, wherein the beamforming transmission comprises transmitted radio beams that swipe a surrounding. The network node is configured to determine the position of the object by being configured to analyse the signal strength or the signal quality of the transmitted radio beams and to compare the signal strength or the signal quality with signal strength or signal quality from a previous beamforming transmission that swipe the surrounding. The network node is further configured to provide an output indicating the determined position of the object.

Embodiments herein provide a manner of determining or detecting objects from a beamforming transmission. A very efficient system is provided by using the existing network nodes, such as base stations already implemented in a city. The provided output may be used to warn vehicles about e.g. obstacles ahead of their routes. The embodiments herein may further use beamforming such as 5G to detect a passive reflector item such as smart textiles, gadgets, and/or other obstacles with the advantage allowing the network nodes to be mounted stationary in a physical position. Their stationary positions enable the network node to compare a base model of signal strength or quality of beams with a latest known reflecting surface to detect the position of the object. Further advantages may be that since there are no personal data such as images collected but instead signal strengths or a signal qualities, the system is designed with anonymized information storage, and in that the signal strengths or a signal qualities are continuously updated, close to real time, the result of embodiments herein renders a very accurate and secure system.

BRIEF DESCRIPTION OF THE DRAWINGS

Embodiments will now be described in more detail in relation to the enclosed drawings, in which:

FIG. 6 is a flowchart depicting a method performed by a network node according to some embodiments herein;

FIG. 7 is a flowchart depicting a method performed by a network node according to some embodiments herein;

DETAILED DESCRIPTION

Figure 1:
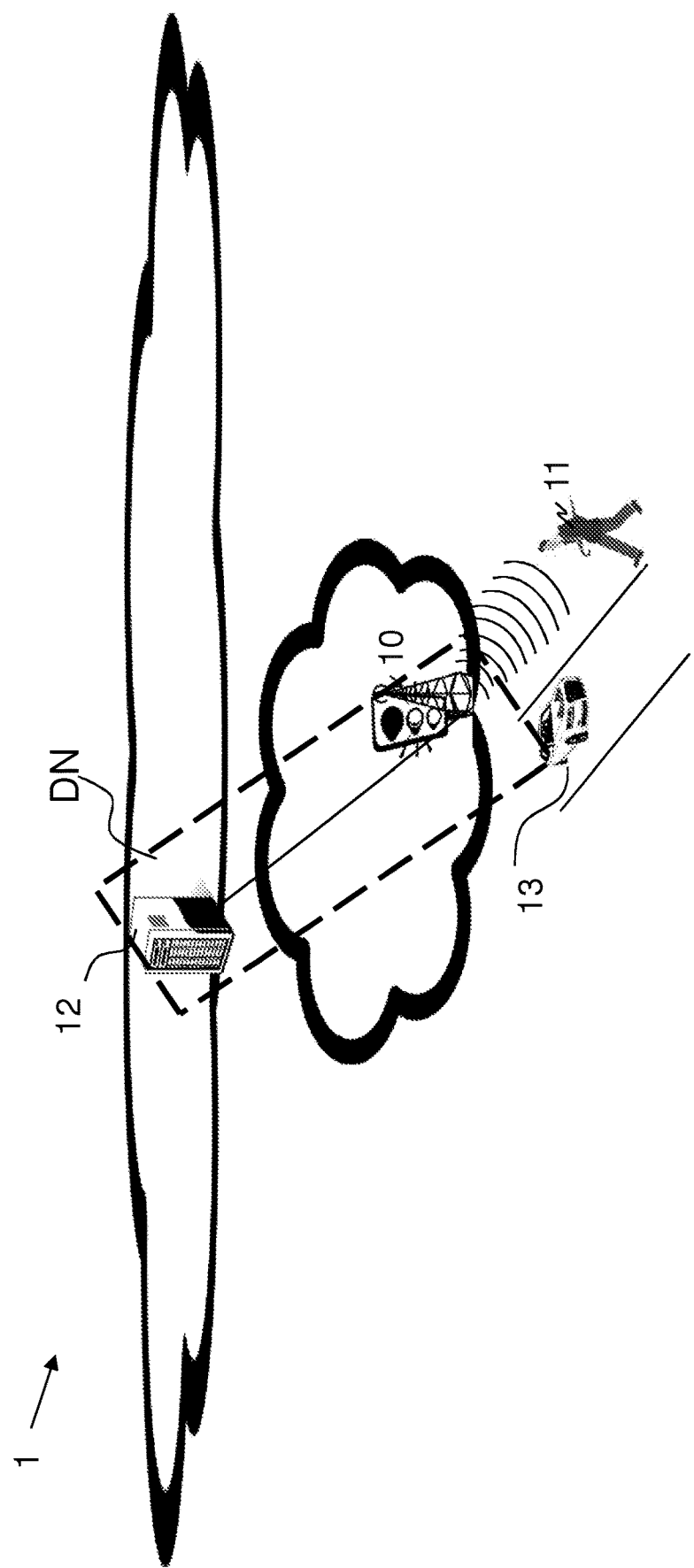
FIG. 1 is a schematic overview depicting a communication network according to embodiments herein.

A Universal Mobile Telecommunications network (UMTS) is a third generation (3G) telecommunications network, which evolved from the second generation (2G) Global System for Mobile Communications (GSM). The UMTS terrestrial radio access network (UTRAN) is essentially a RAN using wideband code division multiple access (WCDMA) and/or High Speed Packet Access (HSPA) for user equipments. In a forum known as the Third Generation Partnership Project (3GPP), telecommunications suppliers propose and agree upon standards for third generation networks, and investigate enhanced data rate and radio capacity. In some RANs, e.g. as in UMTS, several radio network nodes may be connected, e.g., by landlines or microwave, to a controller node, such as a radio network controller (RNC) or a base station controller (BSC), which supervises and coordinates various activities of the plural radio network nodes connected thereto.

Specifications for the Evolved Packet System (EPS), also called a Fourth Generation (4G) network, have been completed within the $3^{rd}$ Generation Partnership Project (3GPP) and this work continues in the coming 3GPP releases, for example to specify a Fifth Generation (5G) network. The EPS comprises the Evolved Universal Terrestrial Radio Access Network (E-UTRAN), also known as the Long Term Evolution (LTE) radio access network, and the Evolved Packet Core (EPC), also known as System Architecture Evolution (SAE) core network. E-UTRAN/LTE is a variant of a 3GPP radio access network wherein the radio network nodes are directly connected to the EPC core network rather than to RNCs. In general, in E-UTRAN/LTE the functions of an RNC are distributed between the radio network nodes, e.g. eNodeBs in LTE, and the core network. As such, the RAN of an EPS has an essentially "flat" architecture comprising radio network nodes connected directly to one or more core networks, i.e. they are not connected to RNCs. To compensate for that, the E-UTRAN specification defines a direct interface between the radio network nodes, this interface being denoted the X2 interface.

With the emerging 5G technologies such as New Radio (NR), the use of very many transmit- and receive-antenna elements is of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Beamforming allows the signal to be stronger for an individual connection. On the transmit-side this may be achieved by a concentration of the transmitted power in the desired direction(s), and on the receive-side this may be achieved by an increased receiver sensitivity in the desired direction(s). This beamforming enhances throughput and coverage of the connection. It also allows reducing the interference from unwanted signals, thereby enabling several simultaneous transmissions over multiple individual connections using the same resources in the time-frequency grid, so-called multi-user Multiple Input Multiple Output (MIMO). To cover the whole serving area, multiple transmissions with narrow beams differently steered in time domain are also likely to be needed. The provision of multiple narrow coverage beams for this purpose is also called "beam sweeping".

FIG. 1 is a schematic overview depicting a communication network 1. The communication network may comprise e.g. one or more access networks such as radio access networks (RAN) and one or more core networks (CN). The communication network 1 may use one or a number of different technologies, such as NR, Wi-Fi, Long Term Evolution (LTE), LTE-Advanced, Fifth Generation (5G), Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations. Embodiments herein relate to recent technology trends that are of particular interest in a 5G context, however, embodiments are also applicable in further development of the existing wireless communication systems such as e.g. WCDMA and LTE.

The communication network 1 may comprise a network node such as a radio network node 10 providing radio coverage over a geographical area, a service area such as a first cell of a first radio access technology (RAT), such as NR, LTE, Wi-Fi, WiMAX or similar. The radio network node 10 may be a transmission and reception point e.g. a radio network node such as a Wireless Local Area Network (WLAN) access point or an Access Point Station (AP STA), an access node, an access controller, a base station, e.g. a radio base station such as a NodeB, an evolved Node B (eNB, eNode B), a gNodeB (gNB), a base transceiver station, a radio remote unit, an Access Point Base Station, a base station router, a transmission arrangement of a radio base station, a stand-alone access point or any other network unit or node capable of communicating with a UE such as a vehicle or similar, within the area served by the radio network node 10 depending e.g. on the first radio access technology and terminology used. The radio network node 10 may be referred to as a serving network node wherein the first cell may be referred to as a serving cell, and the serving network node communicates with UEs in form of DL transmissions to the UEs and UL transmissions from the UEs. It should be noted that a service area may be denoted as cell, beam, beam group or similar to define an area of radio coverage.

The radio network node 10 performs beamforming transmissions wherein multiple transmissions with e.g. narrow beams differently steered in the time domain are performed by the radio network node 10. The radio network node 10 may be structured as a traffic light, a traffic sign or similar. According to embodiments herein the beamforming transmission comprises transmitted radio beams that swipe a surrounding. The beamforming transmission is then used to determine position of an object 11, such as a pedestrian, an animal, a vehicle, a lost object or similar.

According to embodiments herein the communication network 1 comprises another network node 12, such as a controller node, a core network node or a server, for handling data of objects in the communication network. The methods according to embodiments herein are performed by a network node such as the radio network node 10 or the other network node 12. As an alternative, a Distributed Node (DN) and functionality, e.g. comprised in a cloud as shown in FIG. 1 may be used for performing or partly performing the methods. The other network node 12 may be collocated with the radio network node 10 and/or the other network node 12 may be a server, a stand-alone node, or a logical node.

In the communication network 1, one or more vehicles 13 such as cars, autonomous cars, mobile stations, drones, boats, airplanes, and/or wireless terminals, may communicate via one or more Access Networks (AN), e.g. RAN, to one or more core networks (CN). It should be understood by the skilled in the art that "vehicle" is a non-limiting term which means any moving terminal, wireless communication terminal, user equipment, Machine Type Communication (MTC) device, Internet of Things (IoT) operable device, Device to Device (D2D) terminal, or node e.g. smart phone, laptop, mobile phone, sensor, relay, mobile tablets or even a small base station capable of communicating using radio communication with a network node within an area served by the network node.

According to embodiments herein beamforming transmissions are used to detect presence, direction and/or speed of the object 11. This information may then be provided to e.g. the vehicle 13 and/or a managing server e.g. within the network node or to the other network node 12. E.g. the network node 12 may manage a virtual map and based on the detected object the virtual map may be created dynamically and displayed for the vehicle 13 e.g. displaying a zebra crossing based on the detected object 11 or change direction of traffic in traffic lanes based on detected object 11, just to mention a few examples. Thus, embodiments herein may use already implemented radio network nodes that are used for communication but now for presence detection to e.g. manage traffic within a city.

Figure 2:
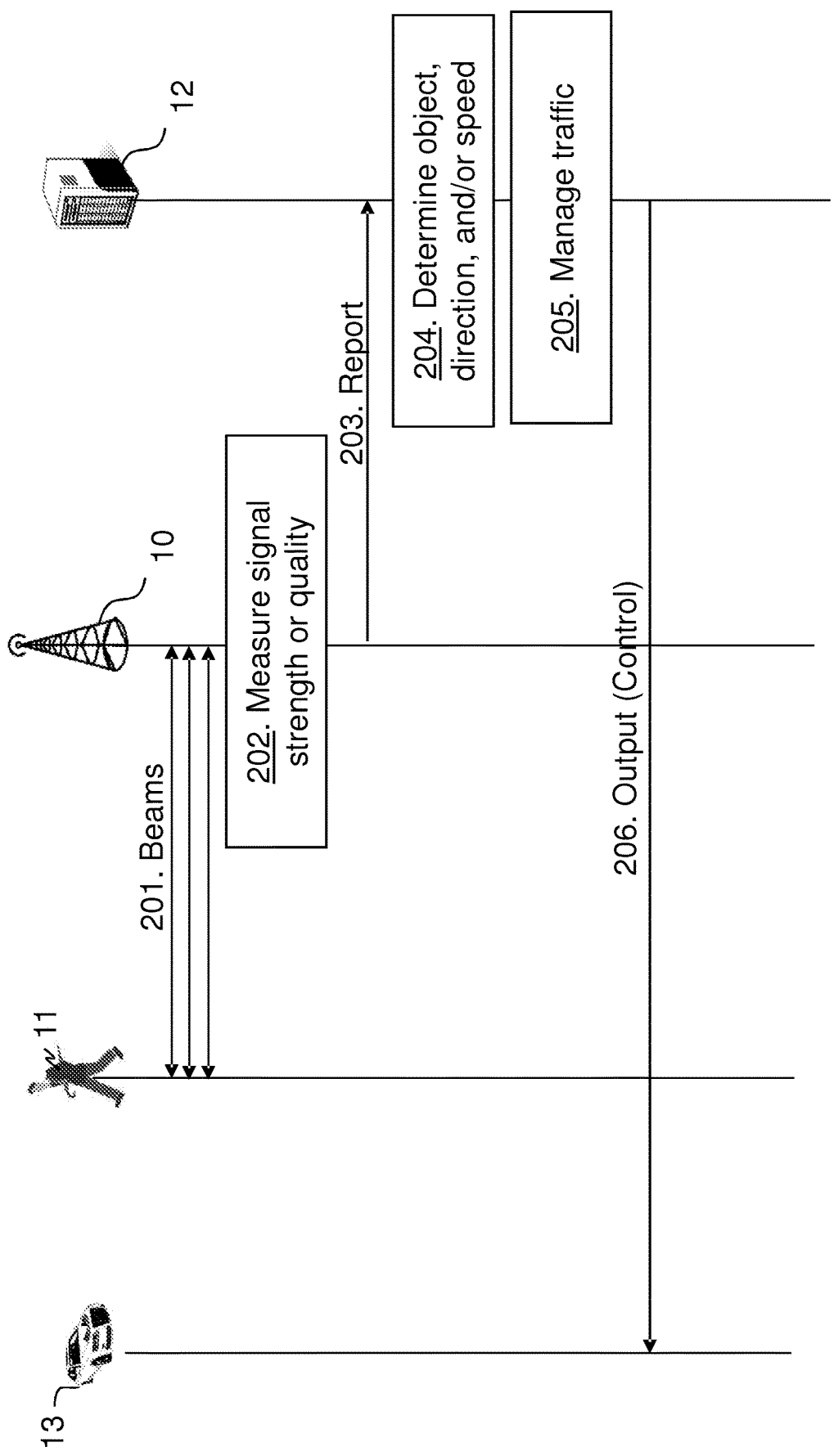
FIG. 2 is a combined flowchart and signalling scheme according to embodiments herein.

FIG. 2 shows a combined flowchart and signalling scheme depicting a procedure according to embodiments herein. Here the network node is exemplified as a standalone node being e.g. the other network node 12 in FIG. 1.

Action 201. The radio network node 10 performs one or more beamforming transmissions.

Action 202. The radio network node 10 measures signal strength and/or quality such as signal to interference plus noise ratio (SINR), reference signal received power (RSRP), reference signal received quality (RSRQ) or signal to noise ratio (SNR) of the transmitted radio beams that swipe the surrounding of the radio network node 10. In some embodiments herein the object may be a reflecting object e.g. built into textiles reflecting characteristics in a similar manner as near field communication, functioning as a digital reflex. Alternatively or additionally, measurements may be performed on received transmissions reported back to the radio network node 10 or on transmissions performed by another network node.

Action 203. The radio network node 10 may send a report to the network node 12, wherein the report comprises the measured signal strength and/or quality or indication of the measured signal strength and/or quality. The report may be sent when the measured signal strength and/or quality deviates from a threshold e.g. previous measured value, or may be sent continuously upon every measurement.

Action 204. The network node 12 then receives the report and determines the position of the object 11 e.g. determine that a person is present on a sidewalk. Furthermore, the network node 12 may determine a direction of movement of the object and/or speed of the movement. E.g. the network node 12 may compare the signal strength and/or quality with previous beamforming transmissions and e.g. previous learned movement patterns that the object is about to cross a street. Thus, SNRs of many beamforming transmissions may be stored and a disturbance is detected comparing to the stored SNRs.

Action 205. The network node 12 may further manage traffic in a traffic management system e.g. switch to red light on a traffic light, create a zebra crossing in a virtual map, change traffic direction of a lane in the virtual map or similar. This may be handled by a separate network node such as a traffic management node. Traffic herein meaning traffic of vehicles or transportation traffic.

Action 206. The network node 12 then provides an output indicating the determined position of the object 11. E.g. the network node 12 transmits a control command or display data to the vehicle such as data displaying the created zebra crossing, data displaying the traffic direction of the lane, data controlling speed of the vehicle or similar. The network node 12 may also control other traffic related devices such as traffic lights or traffic signs.

Figure 3:
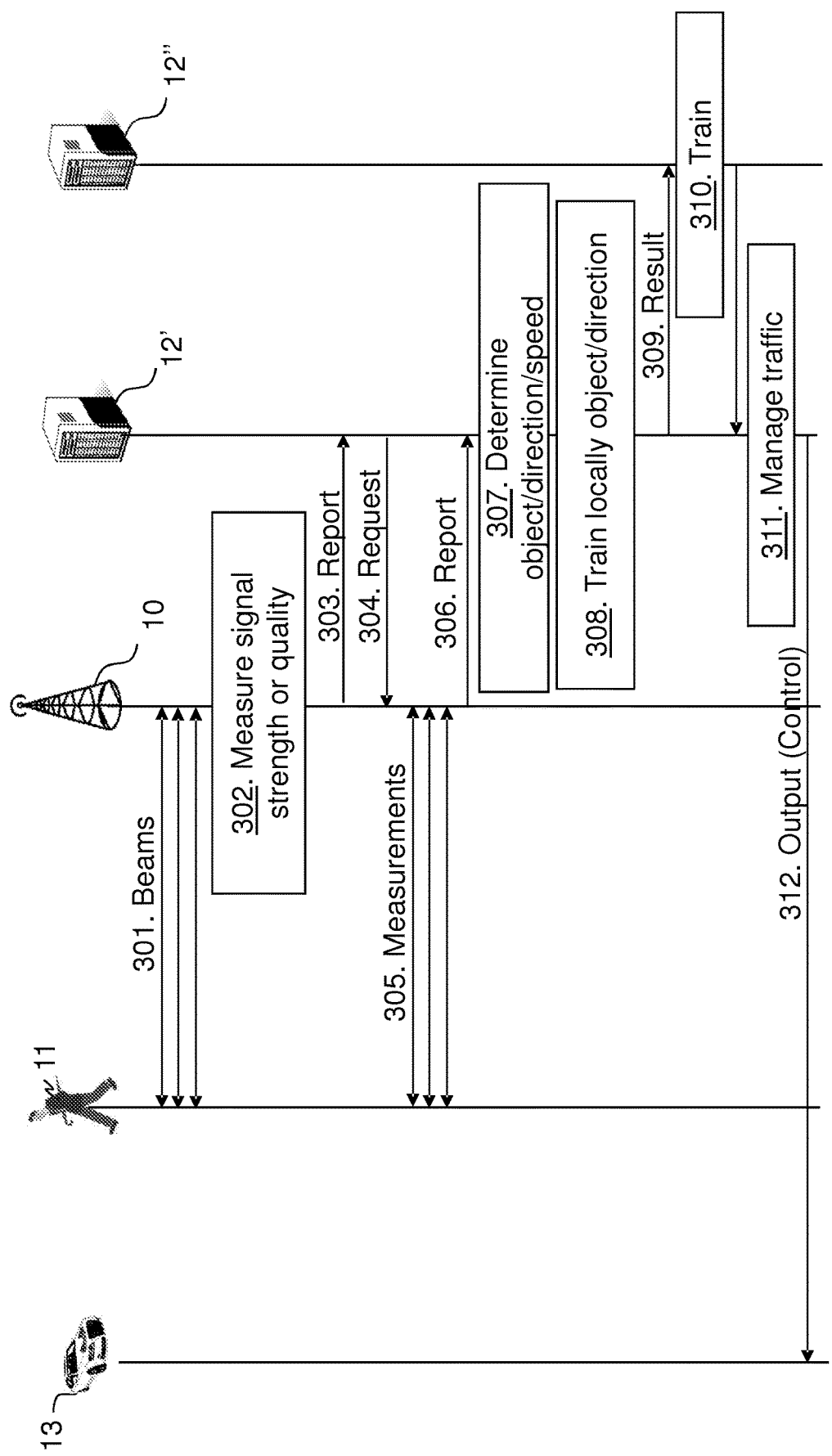
FIG. 3 is a combined flowchart and signalling scheme according to embodiments herein.

FIG. 3 shows a combined flowchart and signalling scheme depicting a procedure according to embodiments herein. Here the network node is exemplified as a distributed node being e.g. a local network node 12' and a macro network node 12". Local network node means a network node serving a local area network and/or macro network node is a training node collecting data from a plurality of local network nodes.

Action 301. The radio network node 10 performs one or more beamforming transmissions.

Action 302. The radio network node 10 measures signal strength and/or quality, such as SINR, RSRP, RSRQ or SNR, of the transmitted radio beams that swipe the surrounding of the radio network node 10.

Action 303. The radio network node 10 may send a report to the local network node 12', wherein the report comprises the measured signal strength and/or quality or indication of the measured signal strength and/or quality. The report may be sent when the measured signal strength and/or quality deviates from a threshold e.g. a previous measured value or may be sent continuously upon every measurement.

Action 304. The local network node 12' may then request radio network node or other radio network nodes to perform further measurements, e.g. as in the action 302.

Action 305. The radio network node 10 may then perform further measurements as requested.

Action 306. The radio network node 10 may then report these further measurements to the local network node 12' in one or more reports.

Action 307. The local network node 12' may, based on the one or more reports, determine the position, i.e. presence, of the object 11 e.g. determine that an animal is close to a road. E.g. the local network node 12' may compare results in the reports with to previous measured or stored signal strengths or signal qualities to determine interruptions indicating objects. Furthermore, the local network node 12' may determine the direction of movement of the object 11 and/or the speed of the movement.

Action 308. The local network node 12' may further store result of the comparison of beamforming transmissions and train locally the local network node 12' to determine a type of object, a likely direction of movement of an object and so on, in e.g. a neural network algorithm or similar. Examples of object types involve but are not limited to people, animals, vehicles, and dropped objects.

Action 309. The local network node 12' may then transmit the trained local data to detect type of objects, likely direction of movement of objects and so on to the macro network node 12".

Action 310. In order to increase accuracy of detecting type of objects, likely direction of movement of objects and so on, the macro network node 12" may collect data from a number of local network nodes and train on this higher amount of collected data. The macro network node 12" may then feedback a result from the trained algorithm to detect objects to the local network node 12'.

Action 311. The local network node 12' may then further manage traffic in a traffic management system e.g. switch to red light on a traffic light, create a zebra crossing in a virtual map, change traffic direction of a lane in the virtual map or similar. This may be handled by a separate network node such as a traffic management node. However, the local network node 12' may manage the traffic based on the received measurements but may be compared to trained data from the macro network node 12".

Action 312. The local network node 12' may then provide the output indicating the determined position of the object 11. E.g. the local network node 12' transmits a control command or display data to the vehicle 13 e.g. transmits data displaying the created zebra crossing, data displaying the traffic direction of the lane, data controlling speed of the vehicle or similar. The local network node 12' may also control other traffic related devices such as traffic lights or traffic signs.

Figure 4:
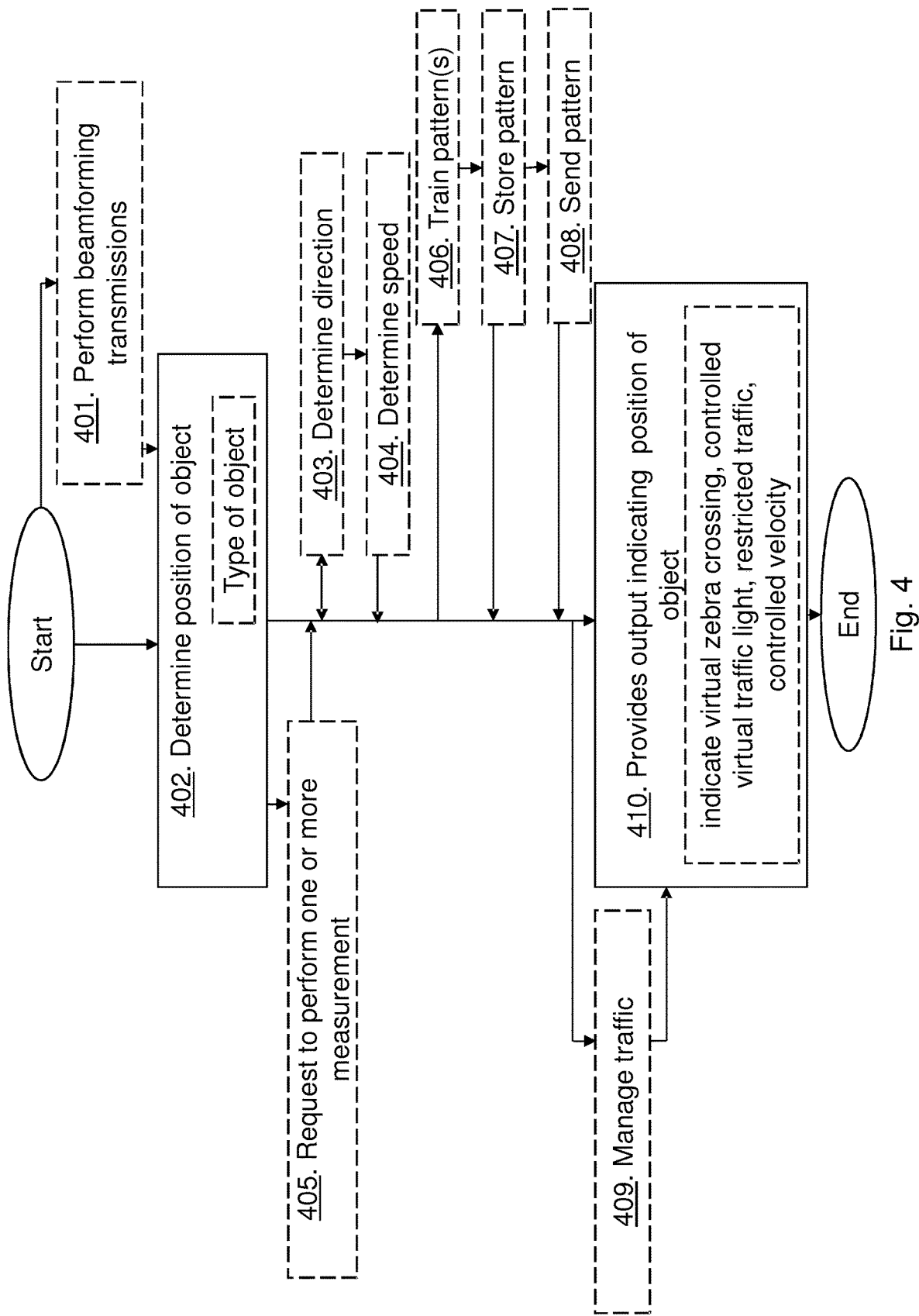
FIG. 4 is a flowchart depicting a method performed by a network node according to embodiments herein.

The method actions performed by the network node, such as the radio network node 10 or the other network node 12 in the communication network for handling data of objects in the communication network according to embodiments herein will now be described with reference to a flowchart depicted in FIG. 4. The actions do not have to be taken in the order stated below, but may be taken in any suitable order. Actions performed in some embodiments are marked with dashed boxes.

Action 401. The network node may perform beamforming transmissions.

Action 402. The network node determines a position of an object based on a signal strength or a signal quality of a beamforming transmission, wherein the beamforming transmission comprises transmitted radio beams that swipe a surrounding. The network node determines the position of the object by analysing the signal strength or signal quality of the transmitted radio beams and compares the signal strength or the signal quality with signal strength or signal quality from a previous beamforming transmission that swipe the surrounding. The transmitted radio beams may be reflected back from the object by a reflecting material or reflecting device. According to embodiments herein using smart objects e.g. built into textiles reflecting characteristics in a similar manner as near field communication, making them as digital reflexes. Smart textile is a fabric with built in sensors or actuators that can act in various scenarios. One possible solution is using some sort of near field communication technique built in to the wearables. Furthermore, passive Near Field Communication (NFC) may take a radio signal and may repeat the signal back typically to a source using induction on the generated magnetic field and with the power may return a unique number, e.g. an identifier of e.g. a card.

The network node may further determine a type of object based on the signal strength or the signal quality of the beamforming transmission. The network node may report a deviation, when comparing the signal strength or the signal quality from the previous beamforming transmission, as an anomaly. A pattern of the deviation related to the signal strength or the signal quality of the transmitted radio beams is compared with data of a database of one or more known objects. E.g. New radio (NR) beams swipe surrounding and the network node reports back the SNR which is analyzed and is checked for deviations. Detected deviation may be reported as anomaly and the pattern of the reflecting item may be analyzed and compared with a database of known object. E.g., one or more patterns of signal strengths or qualities of the beams indicate a person, an animal or e.g. a vehicle.

Action 403. The network node may determine a direction of movement of the object. Reliability of a direction of a path may be determined e.g. studying previous behaviours of detected objects may be used to determine reliability of the direction. The reliability of the direction indicates e.g. likelihood that a person crosses a street right away, versus follows the street a few meters and then crosses the street.

Action 404. The network node may additionally determine a speed of movement of the object. This may also be considered in determining likelihood that a person crosses a street right away, versus follows the street a few meters and then crosses the street.

Action 405. The network node may request a transmitting network node to perform one or more measurement for collecting more measurements for determining the position, a direction and/or speed. E.g. the network node may send a request to one or more measuring radio network nodes to collect data to determine position, speed, or direction.

Action 406. The network node may train one or more patterns of different objects by collecting results of beamforming transmissions.

Action 407. The network node may additionally store the one or more trained patterns for each object in a database. In addition to store the one or more trained patterns, the one or more trained patterns may further be tested and updated on e.g. other local areas, so that a global pattern may be smarter or more accurate over time.

Action 408. Additionally, the network node may send the one or more trained patterns to a network node for training a machine learning algorithm. The network node may thus train locally to collect patterns locally and send these to database collecting data of a wider area. The network node may be a distributed node comprising a local part and a macro part. Thus, reflexing data collected anonymous and filtered for different stakeholders may be stored into a knowledge base for each object type. Examples of object types involve but are not limited to people, animals, vehicles, dropped objects. The database of know objects may have an artificial intelligence self-learning algorithm that collects information from many base stations to a knowledge base. Furthermore, actions or actionable insights related to the pattern may also be sent. Such patterns and actions may e.g. be when person moving on the street, send a warning. In such a way intelligence can be brought to the cloud to support sensors in the vehicles to perform right type of actions e.g. emergency breaking.

Action 409. The network node may manage traffic, e.g. traffic structure such as zebra crossings and/or driving directions of traffic lanes, based on the determined position of the object. E.g. the network node may allocate road space for a prioritized traffic type or direction. E.g. the network node may allocate two lanes out of three lanes in one direction when an obstacle is detected or similar. E.g. the network node may observe (reflecting) objects and to proactively allocate road space for most prioritized traffic or passage. The object may be one or more pedestrians and/or an obstacle and the network node may manage the traffic by adding or removing a virtual zebra crossing in a virtual traffic map, controlling a virtual traffic light, controlling a geo-fence for restricting traffic, controlling velocity, or similar. Geo-fence is a virtual perimeter for a real-world geographic area, area for short, that may be used to restrict movement of a vehicle, e.g. the vehicle may not be allowed to enter the area or may be forced to use a very low speed within the area. Thus, embodiments herein may use geo fencing to control traffic such as vehicles e.g. cars or drones, and pedestrians. Furthermore, when a detected object indicates to cross a street a temporary digital zebra crossing is created as a digital twin in e.g. a virtual map, and this temporary digital zebra crossing is reported to all approaching vehicles, which will take necessary action, such as stop/brake. When the pedestrian has crossed the street the temporary digital zebra crossing is removed and the removal is sent to all the vehicles. Thus, these sent indicators may be triggered by the detected objects such as observed reflecting objects.

Action 410. The network node provides an output indicating the determined position of the object. E.g. the network node may transmit an indication indicating the position of the object to one or more vehicles, or a network server. In case the network node manages traffic the network node may provide input to a virtual map outputted to a driver of the vehicle. The network node may output the indication by e.g. sending information to one or more vehicles for indicating the virtual zebra crossing, the controlled virtual traffic light, the restricted traffic, controlled velocity for the one or more vehicles. The network node may transmit a value, an index to a vehicle of the position of the detected object. Embodiments herein may be used by using 'spare' capacity in radio (when radio not in use for heavy network usage such as Netflix downloading, or other heavy streaming services) to collect data that later on can be possible to monetize for the network equipment owners, i.e. owner of trained data may sell the trained data to detect the different objects. Since there are no images or other personal data collected, the system is designed with anonymized information storage e.g. by its private design system. The system may thus be disclosing a real time system since continuously updated data (close to real time) are used. Some embodiments herein enable to proactively warn vehicles of people and animals that are about to cross a street even outside line of sight of the vehicle. Proactively warn means that warn of a possible crossing may be sent out. Furthermore, the network node may adjust speed to minimize accidents and decrease energy loss that otherwise may happen due to sudden breaks and start.

Figure 5:
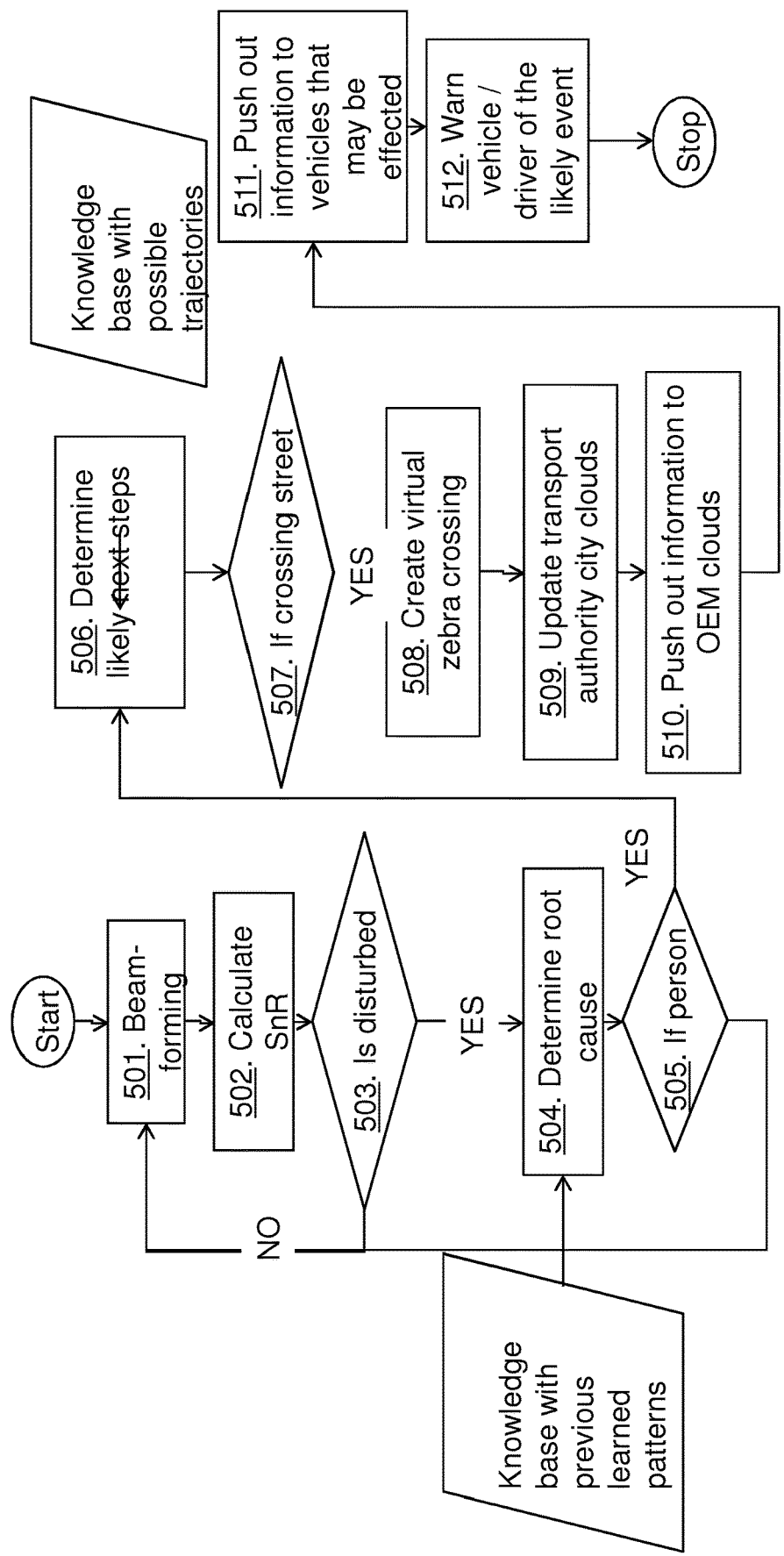
FIG. 5 is a flowchart depicting a method performed by a network node according to some embodiments herein.

FIG. 5 is a schematic flowchart depicting some embodiments herein.

Action 501. The network node performs a beamforming or is involved in a beamforming process. E.g. transmits beams in a sweeping manner i.e. sequentially transmitted or receives beams from another network node.

Action 502. The network node calculates SNR for the different beams.

Action 503. Based on the calculated SNR the network node may determine if the one or more beams are disturbed.

Action 504. In case disturbed, the network node may determine root cause e.g. based on knowledge base with previous learned patterns.

Action 505. The network node may determine that the disturbed beam is an indication that a person is present.

Action 506. The network node may further determine a likely next step of the person e.g. based on knowledge base with possible trajectories.

Action 507. The network node may determine that the person is crossing a street.

Action 508. The network node may thus create a virtual zebra crossing in a virtual map.

Action 509. The network node may thus update transport authority city clouds with e.g. this virtual zebra crossing.

Action 510. The information is pushed out to the original equipment manufacturers (OEM) clouds to enable update in the network.

Action 511. The information is pushed out to the vehicles that may be affected.

Action 512. The information may trigger a behaviour at the vehicle such as warn vehicle or driver of the likely event.

FIG. 6 is a schematic flowchart depicting some embodiments herein training patterns for assisting in determining what causes an interruption or disturbance in a beam sweeping procedure.

Action 601. The network node or another radio network node performs beamforming e.g. transmits one or more beams or receives one or more beams.

Action 602. The detected beam or beams or signal is annotated with a geographical position and a time stamp indicating time and position.

Action 603. The network node may then classify manually or using sensor classifications e.g. from passing vehicles using the same key, time and place (person, obstacle, animal . . . ) the disturbance or measurements.

Action 604. The network node may then update the knowledge base. The knowledge base may comprise previous learned patterns.

FIG. 7 is a schematic flowchart depicting some embodiments herein training patterns for assisting in determining what causes an interruption or disturbance in a beam sweeping procedure.

Action 701. The network node or another radio network node may study detected signals over time and learn trajectories.

Action 702. The network node may use learning algorithms to detect model of a likely pattern.

Action 703. The network node may then update the knowledge base. The knowledge base may comprise possible trajectories.

Figure 8:
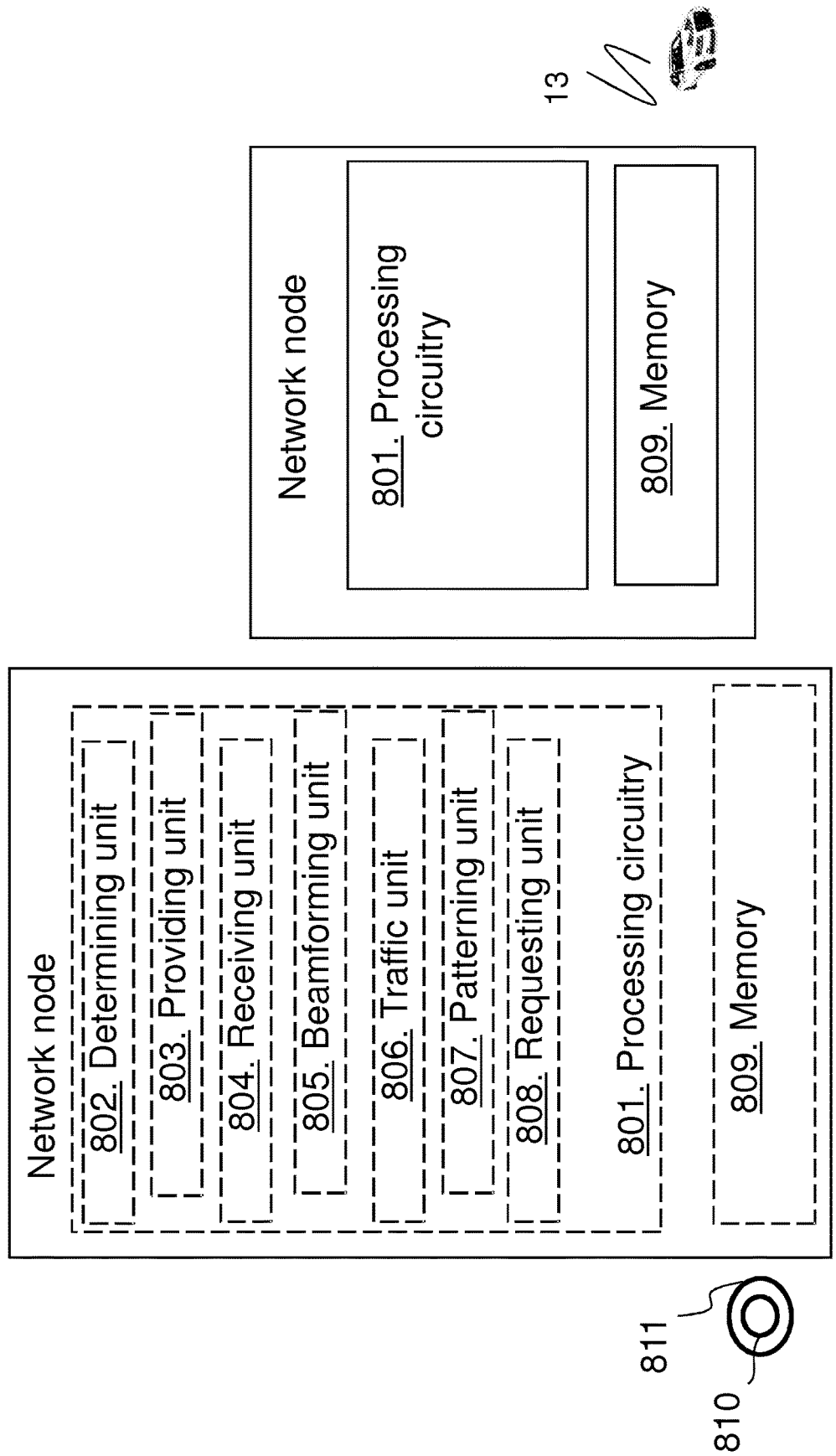
FIG. 8 is a block diagram depicting a network node according to embodiments herein.

FIG. 8 is a block diagram depicting the network node in a communication network for handling data of objects in the communication network.

The network node may comprise processing circuitry 1901, e.g. one or more processors, configured to perform the methods herein.

The network node may comprise a determining unit 802. The network node, the processing circuitry 801, and/or the determining unit 802 is configured to determine a position of an object based on a signal strength or a signal quality of a beamforming transmission. The beamforming transmission, or beamforming transmissions function, comprises transmitted radio beams that swipe a surrounding. The network node, the processing circuitry 801, and/or the determining unit 802 is configured to determine the position of the object by being configured to analyse the signal strength or the signal quality of the transmitted radio beams and to compare the signal strength or the signal quality with signal strength or signal quality from a previous beamforming transmission that swipes the surrounding. The network node, the processing circuitry 801, and/or the determining unit 802 may be configured to determine the type of object based on the signal strength or the signal quality of the beamforming transmission. The network node, the processing circuitry 801, and/or the determining unit 802 may be configured to determine the direction of movement of the object. The network node, the processing circuitry 801, and/or the determining unit 802 may be configured to determine the speed of movement of the object.

The network node may comprise a providing unit 803, such as a transmitter, transceiver or similar. The network node, the processing circuitry 801, and/or the providing unit 803 is configured to provide an output indicating the determined position of the object. The network node, the processing circuitry 801, and/or the providing unit 803 may be configured to report a deviation, when comparing the signal strength or the signal quality with the signal strength or the signal quality from the previous beamforming transmission, as an anomaly, and a pattern of the deviation related to the signal strength or the signal quality of the transmitted radio beams is compared with data of a database of one or more known objects. The network node, the processing circuitry 801, and/or the providing unit 803 may be configured to provide the output by being configured to transmit the indication indicating the position of the object to one or more vehicles, or a network server. The network node, the processing circuitry 801, and/or the providing unit 803 may be configured to provide the output by being configured to transmit an information to one or more vehicles for indicating the virtual zebra crossing, the controlled virtual traffic light, the restricted traffic, controlled velocity for the one or more vehicles.

The network node may comprise a receiving unit 804, such as a receiver, a transceiver or similar. The network node, the processing circuitry 801, and/or the receiving unit 804 may be configured to receive the transmitted radio beams as they are reflected back from the object by a reflecting material or reflecting device.

The network node may comprise a beamforming unit 805, such as a transmitter, a transceiver or similar. The network node, the processing circuitry 801, and/or the beamforming unit 805 may be configured to perform the beamforming transmission.

The network node may comprise a traffic unit 806. The network node, the processing circuitry 801, and/or the traffic unit 806 may be configured to manage a traffic based on the determined position of the object. The network node, the processing circuitry 801, and/or the traffic unit 806 may be configured to manage the traffic by being configured to allocate road space for a prioritized traffic type or direction. The network node, the processing circuitry 801, and/or the traffic unit 806 may be configured to manage, when the object is one or more pedestrians and/or an obstacle, the traffic by being configured to add or remove the virtual zebra crossing in the virtual traffic map, control the virtual traffic light, control the geo-fence for restricting traffic, and/or the control velocity.

The network node may comprise a patterning unit 807. The network node, the processing circuitry 801, and/or the patterning unit 807 may be configured to train one or more patterns of different objects by collecting results of beamforming transmissions; and to store the one or more trained patterns for each object in a database.

The network node, the processing circuitry 801, and/or the providing unit 803 may be configured to send the one or more trained patterns to another network node for training a machine learning algorithm.

The network node may comprise a requesting unit 808. The network node, the processing circuitry 801, and/or the requesting unit 808 may be configured to request a transmitting network node to perform one or more further measurement for collecting more measurements for determining the position, a direction and/or a speed.

The network node may be a distributed node comprising a local part and a macro part.

The network node further comprises a memory 809. The memory comprises one or more units to be used to store data on, such as context, data, processes to process the data, beamforming information, patterns, signal strength or quality, thresholds, applications to perform the methods disclosed herein when being executed, and similar.

The methods according to the embodiments described herein for the network node are respectively implemented by means of e.g. a computer program product 810 or a computer program, comprising instructions, i.e., software code portions, which, when executed on at least one processor, cause the at least one processor to carry out the actions described herein, as performed by the network node. The computer program 810 may be stored on a computer-readable storage medium 811, e.g. a universal serial bus (USB) stick, a disc or similar. The computer-readable storage medium 811, having stored thereon the computer program product, may comprise the instructions which, when executed on at least one processor, cause the at least one processor to carry out the actions described herein, as performed by the network node. In some embodiments, the computer-readable storage medium may be a non-transitory computer-readable storage medium.

Figure 9:
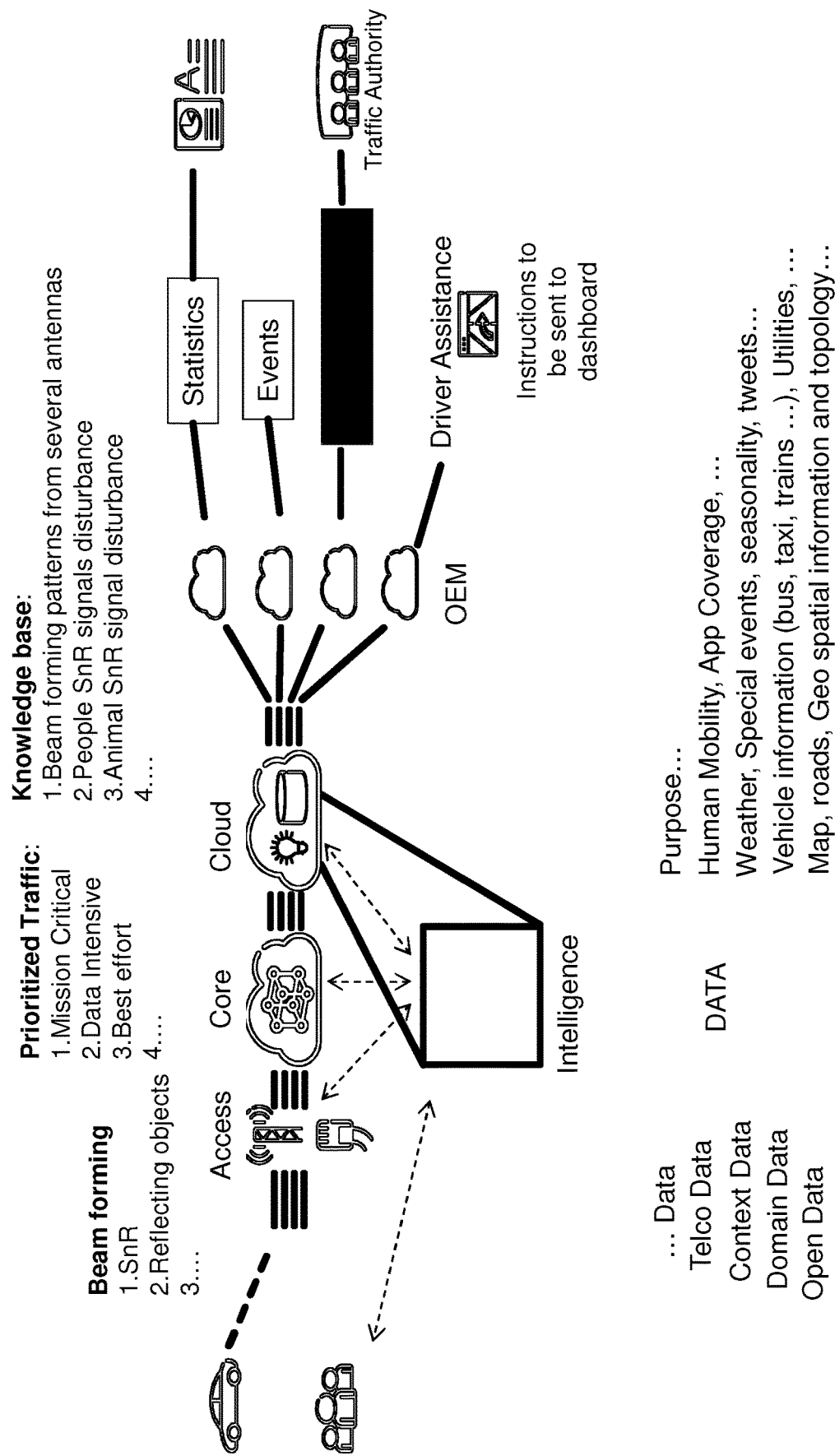
FIG. 9 is a schematic overview of a system according to some embodiments herein.

FIG. 9 is a schematic overview of a system implementing embodiments herein. Beamforming is used to localized and/or detect objects and project trajectories. Intelligence is built up e.g. collecting beamforming patterns from several antennas and trained patterns of people or animal SNR signals disturbances. The trained data may be distributed to e.g. different OEMs and further to collect statistics, determine events, policies and rules of traffic authorities, or e.g. to driver assistance such as instructions sent to dashboards. Data that may be collected and used may e.g. be telco data, context data, domain data, open data e.g. Human Mobility, App Coverage, Weather, Special events, seasonality, tweets, Vehicle information (bus, taxi, trains . . . ), Utilities, Map, roads, Geo spatial information and topology.

As will be readily understood by those familiar with communications design, that functions means or units may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a communication device, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communication devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node in a communication network for handling data of objects in the communication network, the method comprising:
   determining a position of an object based on one of a signal strength a signal quality of a beamforming transmission, the beamforming transmission comprising transmitted radio beams that swipe a surrounding, and determining the position of the object comprising analysing the one of the signal strength and the signal quality of the transmitted radio beams and comparing the one of the signal strength and the signal quality with the one of the signal strength and the signal quality from a previous beamforming transmission that swipe the surrounding;
   providing an output indicating the determined position of the object; and
   managing traffic in an area based on the determined position of the object, managing traffic comprising allocating road space for one of a prioritized traffic type and direction.

2. The method according to claim 1, wherein determining the position of the object further comprises determining a type of object based on the one of the signal strength and the signal quality of the beamforming transmission.

3. The method according to claim 1, wherein a deviation when comparing the signal strength or the signal quality with the one of the signal strength and the signal quality from the previous beamforming transmission is reported as an anomaly, and a pattern of the deviation related to the one of the signal strength and the signal quality of the transmitted radio beams is compared with data of a database of one or more known objects.

4. The method according to claim 1, further comprising determining a direction of movement of the object.

5. The method according to claim 4, further comprising determining a speed of movement of the object.

6. The method according to claim 1, wherein the transmitted radio beams are reflected back from the object by one of a reflecting material and reflecting device.

7. The method according to claim 1, wherein providing the output comprises transmitting an indication indicating the position of the object to one of one or more vehicles, and a network server.

8. The method according to claim 1, wherein the beamforming transmission is performed by the network node.

9. The method according to claim 1, wherein the object is at least one of one or more pedestrians and an obstacle, and managing the traffic in the area comprises one of adding and removing a virtual zebra crossing in a virtual traffic map, controlling a virtual traffic light, controlling a geo-fence for restricting traffic, and controlling velocity.

10. The method according to claim 9, wherein providing the output comprises sending information to one or more vehicles for indicating the virtual zebra crossing, the controlled virtual traffic light, the restricted traffic, controlled velocity for the one or more vehicles.

11. The method according to claim 1, comprising:
    training one or more patterns of different objects by collecting results of beamforming transmissions; and
    storing the one or more trained patterns for each object in a database.

12. The method according to claim 11, comprising sending the one or more trained patterns to a network node for training a machine learning algorithm.

13. The method according to claim 1, comprising:
    requesting a transmitting network node to perform one or more measurements for collecting more measurements for determining at least one of the position, a direction and speed.

14. The method according to claim 1, wherein the network node is a distributed node comprising a local part and a macro part.

15. A network node in a communication network for handling data of objects in the communication network, the network node configured to:
- determine a position of an object based on one of a signal strength and a signal quality of a beamforming transmission, the beamforming transmission comprising transmitted radio beams that swipe a surrounding, and the network node configured to determine the position of the object by being configured to analyse the one of the signal strength and the signal quality of the transmitted radio beams and to compare the one of the signal strength and the signal quality with one of the signal strength and or signal quality from a previous beamforming transmission that swipe the surrounding;
- provide an output indicating the determined position of the object; and
- manage traffic in an area based on the determined position of the object, managing traffic comprising allocating road space for one of a prioritized traffic type and direction.

16. The network node according to claim 15, wherein the network node is further configured to determine a type of object based on the signal strength or the signal quality of the beamforming transmission.

17. The network node according to claim 15, wherein the network node is configured to report a deviation, when comparing the one of the signal strength and the signal quality with the one of the signal strength and the signal quality from the previous beamforming transmission, as an anomaly, and a pattern of the deviation related to the one of the signal strength and the signal quality of the transmitted radio beams is compared with data of a database of one or more known objects.

18. The network node according to claim 15, wherein the network node is further configured to determine a direction of movement of the object.

\* \* \* \* \*